Feb. 13, 1951 C. W. ATTWOOD 2,541,908
PIPE OR TUBING SUPPORT
Filed July 7, 1945
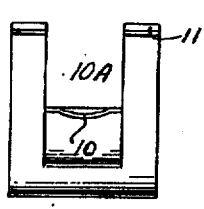
Fig. 1
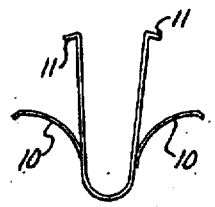
Fig. 2
Fig. 3
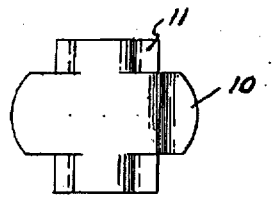
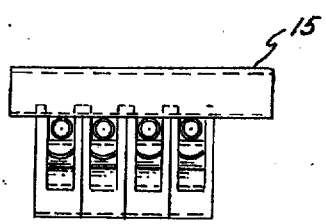
Fig. 4
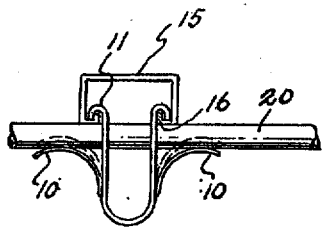
Fig. 5
INVENTOR.
Charles W. Attwood
BY
Francis W. Hardesty
Attorney Patented Feb. 13, 1951

2,541,908

UNITED STATES PATENT OFFICE 2,541,908

PIPE OR TUBING SUPPORT

Charles W. Attwood, Wayne, Mich.

Application July 7, 1945, Serial No. 603,635

2 Claims. (Cl. 248—74)

The present invention relates to tubing or pipe supports and specifically to spring clips or suspending means.

Among the objects of the invention is a spring tubing or pipe support particularly adapted for use with channeled structural members such as shown in United States Patents Nos. 2,327,587, of August 24, 1943; 2,329,815, of Sept. 21, 1943; and 2,363,382 of October 26, 1944, issued to the present inventor though not limited to such members.

Another object is tubing or pipe support which may be placed in position without the use of nails, screws, or other attaching means.

Another object is a support which holds firmly a range of sizes of tubes or pipes.

Another object is a support which the tube being supported acts to fix more firmly the support means.

Still other objects and advantages will be apparent to those skilled in the art upon reference to the following description and the accompanying drawings in which Figs. 1, 2 and 3 are respectively side, end, and top views of the support.

Fig. 4 is a view illustrating the use of the support and

Fig. 5 is an end view of Fig. 4.

The device, as indicated in the drawings, consists of a sheet metal strip having cut out tongues 10 and having the remaining uncut portions formed into small hooks 11. The tongues 10 are bent over and curved as shown in Fig. 2, and may have rounded ends as indicated in Fig. 3.

In the preferred use of the device, it is, as stated above, especially adapted for use with such a channel member as shown in any one of the several patents listed. This form of channel member has a cross section such as is indicated in Fig. 5 at 15, and has the edges of the channel turned inwardly and the extreme edges of the thus formed flanges again turned inwardly so as to produce a slot lengthwise of the member bounded by short upstanding wall portions 16. Channel members of this type are intended for use as structural materials and in the making of various articles.

In utilizing the device for the support of tubes or pipes, the hook portions 11 will be inserted into the channel 15 and upon the device being allowed to expand, these hook portions hook over the flanges 16 and thus are secured in place. By virtue of the opening 10A from which the tongues 10 are displaced, sufficient space is provided between the channel 15 and the tongues for the insertion of tubes or pipes 20, and these are fixed firmly against movement by the action of the tongues 10, as indicated in Figs. 4 and 5.

It is preferred to make the device of spring stock so that the pipes are held resiliently and so that the tongues 10 will not be permanently deformed.

Further, as indicated in Fig. 4, a plurality of the devices may be used alongside each other to support several tubes in a relatively small space since no additional area of material is required for the purpose of fixing the supporting member in place by means of screws, bolts, etc.

Further, because of the fact that the tongues 10 are of spring material, different size pipes or tubes are firmly fixed without any adjustment.

It is of course obvious that other means of supporting the clips and tubes than the particular channel indicated at 15 may be used.

Now having described the invention and the preferred embodiment thereof, it is to be understood that said invention is to be limited, not to the specific details herein set forth, but only by the scope of the claims which follow:

I claim:

1. In combination with a longitudinally slotted support having flanges at the sides of said slot, a tube supporting clip consisting of a U-shaped member having hook portions at the extremities of its arms and adapted to coact with said flanges, said arms having portions displaced outwardly therefrom to provide openings in said arms for the passage of a tube or pipe with said displaced portions forming tongues adjacent said openings.

2. In combination with a longitudinally slotted support having flanges at the sides of said slot, a tube supporting clip consisting of a U-shaped member having hook portions at the extremities of its arms and adapted to coact with said flanges, and having tongues displaced outwardly from intermediate portions of said arms whereby to provide openings in said arms for the passage of a tube or pipe, said tongues being curved with the convex side toward said support.

CHARLES W. ATTWOOD.

REFERENCES CITED

The following references are of record in the file of this patent:

UNITED STATES PATENTS

| Number | Name | Date |
|---|---|---|
| 325,767 | Prior | Sept. 8, 1885 |
| 1,170,542 | Joseph | Feb. 8, 1916 |
| 1,210,701 | Ryden | Jan. 2, 1917 |
| 1,400,155 | Greenburg | Dec. 13, 1921 |
| 2,366,456 | Pheazey | Jan. 2, 1945 |

FOREIGN PATENTS

| Number | Country | Date |
|---|---|---|
| 158,629 | Great Britain | Feb. 7, 1921 |